Patented Oct. 6, 1942

2,297,811

UNITED STATES PATENT OFFICE 2,297,811

PRODUCTION OF NITRILES

Emil Stocker, Basel, Switzerland, assignor to J. R. Geigy A. G., Basel, Switzerland No Drawing. Application May 10, 1940, Serial No. 334,466. In Switzerland May 27, 1939

9 Claims. (Cl. 260—465)

This invention relates to the production of nitriles from carboxylic acid amides and acid halides, and has for its object the ready production of such nitriles, more especially phthalonitrile, of excellent purity and with a good yield.

According to the invention nitriles, especially phthalonitrile, can be obtained with a very good yield and of excellent purity, by reacting carboxylic acid amides (especially phthalic acid diamide) with acid halides in the presence of acylated secondary amines.

The treatment of a carboxylic acid amide with phosgene in the presence of a tertiary base for the production of the corresponding nitrile has been known for a long time (Einhorn and Mettler, Ber. 35, 3647 (1902)). For phthalonitrile the reaction is described in Swiss Patent 184,301 with the use of tertiary bases such as pyridine or dimethylaniline. The possibility of using acid chlorides other than phosgene is shown by Swiss Patent 202,545. As acid binding agents all these processes use tertiary organic bases.

That it is possible to use N-substituted acid amides instead of these bases is very surprising as in consequence of the practical absence of basic properties a sufficient acid binding property could not be assumed.

Examples of acylated secondary amines, which can be used according to the present invention are: N-methylformanilide, N-ethylformanilide, N-ethylform-o-toluidide, NN-dimethylacetamide, NN-dimethylbenzamide and tetramethyl urea. Formylated secondary aromatic amines such as N-methyl- or N-ethyl-formanilide, for example in combination with phosgene as acid chloride have proved particularly suitable. They offer various advantages in comparison with the amines used hitherto. Thus the reaction occurs at a lower temperature than with comparable tertiary bases. The final product obtained is pure white. Further, special attention must be drawn to the fact that the reaction takes place particularly rapidly and without substantial loss of phosgene, even in closed vessels. The resulting hydrochloric acid can be removed from the reaction mixture, if desired by exhaustion under reduced pressure, as it is not combined. Further it is of advantage that even mixtures of secondary and tertiary amines, as obtained by manufacture, can be used directly after the acylation. In this manner the substantial expenses involved in separating or purifying secondary and tertiary bases are saved. By reason of their excellent capacity for facilitating and accelerating the nitrile formation the formylated secondary amines are also suitable for use as additions to tertiary amines.

The reaction can also take place in the presence of solvents. Instead of introducing phosgene it may be used for example in the form of its benzene solution.

For working up a reaction mixture, which has been obtained for example by phosgenating phthalic acid diamide in the presence of ethylformanilide, various ways are open. As stated the hydrochloric acid can be withdrawn by reduction of pressure and the separated nitrile filtered off. Should hydrochloric acid still be present in the filtrate, this, if desired, can be removed by the introduction of ammonia gas and filtering off the ammonium chloride crystals. The ethylformanilide recovered, which still contains some dissolved phthalonitrile can be used directly for further experiments, whereby the yield increases relatively to the first experiment or treatment. Further it is possible to precipitate and filter the nitrile from the reaction mixture by the addition of ice or introduction into strong hydrochloric acid. The recovery for example of ethylformanilide is then effected by neutralizing the hydrochloric acid filtrate, and separation of the layers. Any likely content of saponified base is removed by boiling with some formic acid. By fractional distillation in vacuo, water and formic acid are separated. The residue may be used, directly without being distilled, for a new experiment or may even be previously distilled.

Finally it is also possible, by the addition of an organic solvent, which dissolves the nitrile as little as possible, to separate this from the reaction mixture. Instead of the inexpensive phosgene it is also possible to use, according to this invention, other acid chlorides, as for example thionyl chloride, phosphorus oxybromide or phosphorus oxychloride.

The following examples describe some of the numerous methods of carrying out the invention, the parts being given by weight:

Example 1

Into a paste of 82 parts by weight of phthalic acid diamide in 300 parts of N-ethylformanilide, phosgene is introduced for one hour whilst thoroughly stirring, until the increase in weight amounts to about 58 parts. The temperature is maintained at 35° C. by external cooling. After a further 30–60 minutes the reaction is complete. The reaction mixture is allowed to cool to 15–20° C. and 170 parts of finely divided ice are poured into it whilst stirring. After the mixture has been allowed to stand for some time at a low temperature, the phthalonitrile is filtered off and it is successively washed till neutral with dilute hydrochloric acid, a little water, weak soda lye and water. It is dried at 70° C., yield about 70% of the theoretical amount. Melting point 140–142° C.

The acid filtrate is neutralized with calcium carbonate, slaked lime or soda, whilst the temperature is preferably kept low. After separation the raw base recovered is boiled according to the degree of saponification with some formic acid and there are separated by distillation first runnings up to 120° C. and 10 mm. Hg pressure. The distillation residue is used directly for further treatments. Yield of phthalonitrile from second treatment 83–85% of the theoretical amount.

*Example 2*

A reaction mixture according to Example 1, after completion of the reaction, is introduced in a fine state of subdivision into a vessel maintained under reduced pressure. It is even possible at 30–35° C. and 12 mm. pressure to suck off about 85–95% of the hydrochloric acid. After effective cooling the phthalonitrile is filtered off and washed with chlorobenzene. The filtrate is if necessary freed from the remainder of the hydrochloric acid by introducing dry ammonia gas and filtering off the ammonium chloride. It may also be separated by fractional distillation in vacuo. Yield of phthalonitrile 80–85%, with the same melting point.

*Example 3*

An enamelled autoclave is charged with a paste of 82 parts of phthalic acid diamide in 300 parts of N-ethyl-formanilide so that about ⅓ of the capacity is utilized. 104 parts of phosgene are now allowed to flow under pressure for about 20 minutes into the reaction mixture, whilst the temperature is maintained at 32–34° C. During the reaction thorough stirring is effected. One hour after the commencement of the reaction the phosgene is converted, cooling is carried out, the pressure is released and the procedure is as in the above example.

*Example 4*

Into a paste of 82 parts of phthalic acid diamide in 270 parts of N-methylformanilide, phosgene is conducted for one hour at 32° C. whilst stirring until the increase in weight amounts to about 58 parts. The treatment is effected as indicated in Example 1.

*Example 5*

Into a paste of 82 parts of phthalic acid diamide in 270 parts of diethylaniline and 30 parts of N-ethyl-formanilide, which have been diluted with 230 parts of chlorobenzene, phosgene is introduced at 60–65° C. up to an increase in weight of 60–65 parts. After about two hours the reaction solution is poured into 500 parts of water and after being allowed to stand for some time the phthalonitrile is isolated. Yield 75% of the theoretical amount.

A parallel experiment under the same conditions in which the 30 parts of N-ethylformanilide are replaced by 30 parts of diethylaniline, produces chiefly only unchanged phthalic acid diamide.

*Example 6*

82 parts of phthalic acid diamide are formed into a paste with 350 parts of ethylformanilide and whilst stirring there are dropped in at 60° C., 120 parts of thionylchloride. When all the initial material has been converted, the reaction mixture is treated with a little dilute hydrochloric acid and the separated phthalonitrile is filtered off after being allowed to stand.

*Example 7*

82 parts of phthalic acid diamide are formed into a paste with 430 parts of ethylformanilide and treated with 110 parts of phosphorus oxychloride, whilst the temperature is maintained at 30–35° C. After stirring for about six hours at this temperature the phthalic acid diamide is dissolved. The reaction mixture is poured into a little dilute hydrochloric acid, allowed to stand in the cold and the separated phthalonitrile is filtered off.

Instead of the phthalic acid diamide used in the above examples there may be used equally well other amides of mono- or di-carboxylic acids, as for example acetamide and benzamide.

What I claim is:

1. A process for the production of phthalonitrile, comprising causing phthalic acid diamide to react with an acid halide selected from the group consisting of phosgene, thionyl chloride and phosphorus oxychloride of an acylated secondary amine.

2. A process for the production of phthalonitrile, comprising causing phthalic acid diamide to react with phosgene in presence of N-alkylformylamine of the benzene series.

3. A process for the production of phthalonitrile, comprising causing phthalic acid diamide to react with phosgene in presence of N-methylformanilide.

4. A process for the production of phthalonitrile, comprising causing phthalic acid diamide to react with phosgene in presence of N-ethylformanilide.

5. A process for the production of phthalonitrile, comprising causing phthalic acid diamide to react with phosgene in the presence of N-ethylform-o-toluidide.

6. A process for the production of phthalonitrile, comprising causing phthalic acid diamide to react with phosgene in presence of a mixture of an acylated secondary amine and a tertiary amine of the benzene series.

7. A process for the production of phthalonitrile, comprising causing phthalic acid diamide to react with phosgene in presence of an acylated secondary amine of the benzene series and in presence of a solvent.

8. A process for the production of phthalonitrile, comprising causing phthalic acid diamide to react with phosgene in presence of an acylated secondary amine of the benzene series within a closed vessel.

9. A process for the production of phthalonitrile, comprising causing phthalic acid diamide to react with phosgene in presence of an acylated secondary amine of the benzene series within a closed vessel, the hydrochloric acid being removed from the reaction mixture by diminution of gas pressure.

EMIL STOCKER.